United States Patent [19]

Ochi et al.

[11] Patent Number: 5,764,285
[45] Date of Patent: Jun. 9, 1998

[54] IMAGING APPARATUS HAVING AREA SENSOR AND LINE SENSOR

[75] Inventors: Keizou Ochi, Takatsuki; Manji Takano, Amagasaki, both of Japan

[73] Assignee: Minolta Co., Ltd., Osaka, Japan

[21] Appl. No.: 626,349

[22] Filed: Apr. 2, 1996

[30] Foreign Application Priority Data

Apr. 4, 1995 [JP] Japan .................. 7-078660

[51] Int. Cl.$^6$ .................. H04N 5/228; H04N 9/09
[52] U.S. Cl. .................. 348/222; 348/238; 348/262; 348/333
[58] Field of Search .................. 348/222, 238, 348/262, 333, 340, 351; 358/909.1; H04N 5/228, 9/68, 9/09, 5/222

[56] References Cited

U.S. PATENT DOCUMENTS

| | | |
|---|---|---|
| 5,191,435 | 3/1993 | Tsunekawa .................. 358/909.1 |
| 5,264,890 | 11/1993 | Komiya .................. 358/227 |
| 5,422,712 | 6/1995 | Ogino .................. 356/73 |

FOREIGN PATENT DOCUMENTS

| | | |
|---|---|---|
| 4-2279 | 1/1992 | Japan . |
| 4-67836 | 10/1992 | Japan . |

*Primary Examiner*—Sherrie Hsia
*Attorney, Agent, or Firm*—Burns, Doane, Swecker & Mathis, LLP

[57] ABSTRACT

An imaging device, such as an electric camera, in which an optical image of an object is converted into a set of image data. The device includes a line sensor and an area sensor. A lens system impinges the optical image onto the line and area sensors, where the first and second data are produced, respectively. At this time, a scanning mechanism moves the line sensor relative to the optical image to scan the optical image. The first and second data is then synthesized into the image data to be output.

17 Claims, 7 Drawing Sheets

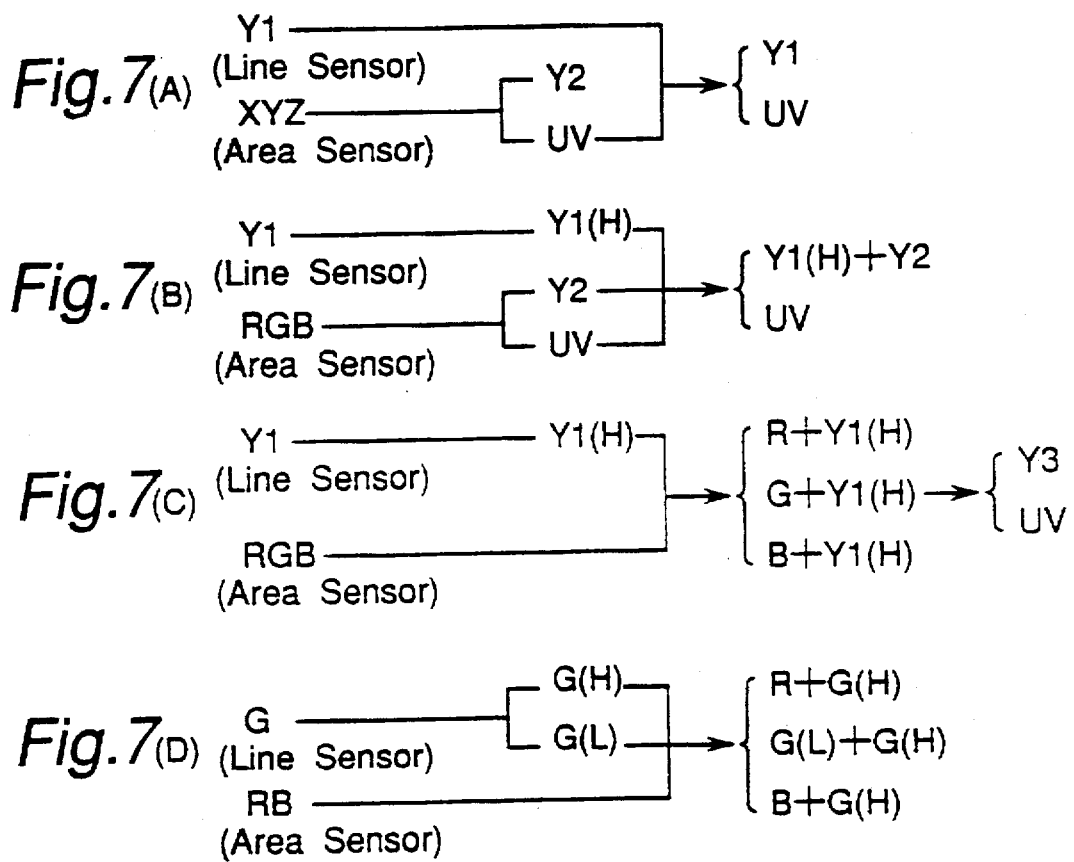

Picture Element

Picture Element

IMAGING APPARATUS HAVING AREA SENSOR AND LINE SENSOR

BACKGROUND OF THE INVENTION

1. Field of the Invention

The present invention relates to an apparatus and method in which an optical image of an object is converted into a set of image data each corresponding to a picture element.

2. Description of the Prior Art

A typical compact video-camera or electronic still-camera (digital camera) converts an optical image of an object into an image signal or image data using an area sensor, i.e., two-dimensional image sensor. Although this area sensor is advantageous for light-weight and compact features, it has a problem in producing an output image of a high resolution. For example, when such camera is used to take a picture of A-4 sized sheet including characters, the area sensor used therein is unable to provide images of characters which are eventually eligible to read.

To produce an image of high resolution, JPB 4-67836 discloses a line-scanning monochrome camera. In this camera, a line sensor, i.e., one-dimensional sensor is combined with a scanning mechanism such as a mirror rotating mechanism so that the object image can be scanned line by line to produce image data on the display. Although the line-scanning camera may provide a high-resolution image, it requires the line sensor to mechanically and repeatedly scan over a two-dimensional optical image, which takes more time for picking up the whole image data of the object than the camera in which the area sensor is used. Also, even when taking a still image, the output image is prone to distort due to camera wobbling.

Further, the line scanning camera reads the optical image line by line, not simultaneously, and therefore it is disadvantageous in taking a time varying image. This hampers the line sensor to be employed either in a high speed imaging device or in an electric viewfinder for displaying the image.

Furthermore, to produce a color image of high resolution with the use of the line sensor requires the object image to be analyzed into three different colors, which increases the number of the image data three times as many as the monochromatic image. This causes the camera to have a buffer having a large capacity, i.e., at least three times as that for monochrome image, in order to temporarily store the image data for a shading correction, a filtering, and a wobble correction. Still further, it takes much time for transmitting the image data and for processing the image data.

SUMMARY OF THE INVENTION

It is therefore an object of the present invention to provide an improved imaging device and method which is capable of taking a high-resolution picture of the object.

To achieve the foregoing and other objects, and to overcome the deficiencies of the prior art, the present invention provides an imaging apparatus for converting an optical image of an object into a set of image data each corresponding to a picture element, which comprises an area sensor for receiving the optical image and then converting the same into a first data, and a line sensor for receiving the optical image and then converting the same into a second data. A lens system is used for focusing the optical image onto the area and line sensors. The line sensor is moved by a scanning mechanism to scan the optical image. The first and second data are synthesized by image processing means to produce a composite data. This composite data is then output as the image data.

Preferably, the first data includes a color information while the second data includes a brightness information. The image processing means produces the composite data by synthesizing the color information and the brightness information together.

In another aspect of the invention, the first image includes a color information of a RGB color system while the second image includes a brightness information. In such case, the image processing means determines a color of each picture element using components of high frequency of the color and brightness information.

In a further aspect of the invention, the line scanning mechanism comprises a mirror and a drive motor for rotating the mirror.

In a still further aspect of the invention, the line scanning mechanism comprises a drive source for moving the line sensor back and forth in a direction perpendicular to an optical axis of the optical image.

The invention may includes an electronic viewfinder to which the first image data is transmitted.

The present invention further provides a method for converting an optical image of an object into a set of image data each corresponding to a picture element, which method comprises receiving the optical image and converting them into a first data using an area sensor, receiving the optical image and converting them into a second data using a line sensor, and producing the image data from the first and second data.

The first data may include a color information while the second data includes a brightness information. The image data is produced by synthesizing the color and brightness information together.

Further, the step of producing the third image data may comprises extracting data with respect to an outline of the object in the optical image from the first data, correcting the second data according to the extracted outline data and outputting the corrected second data as the image data.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 7(A) to (D) show modified processes for synthesizing image data from the fine and area sensors.

DETAILED DESCRIPTION OF THE PREFERRED EMBODIMENTS

Figure 1:
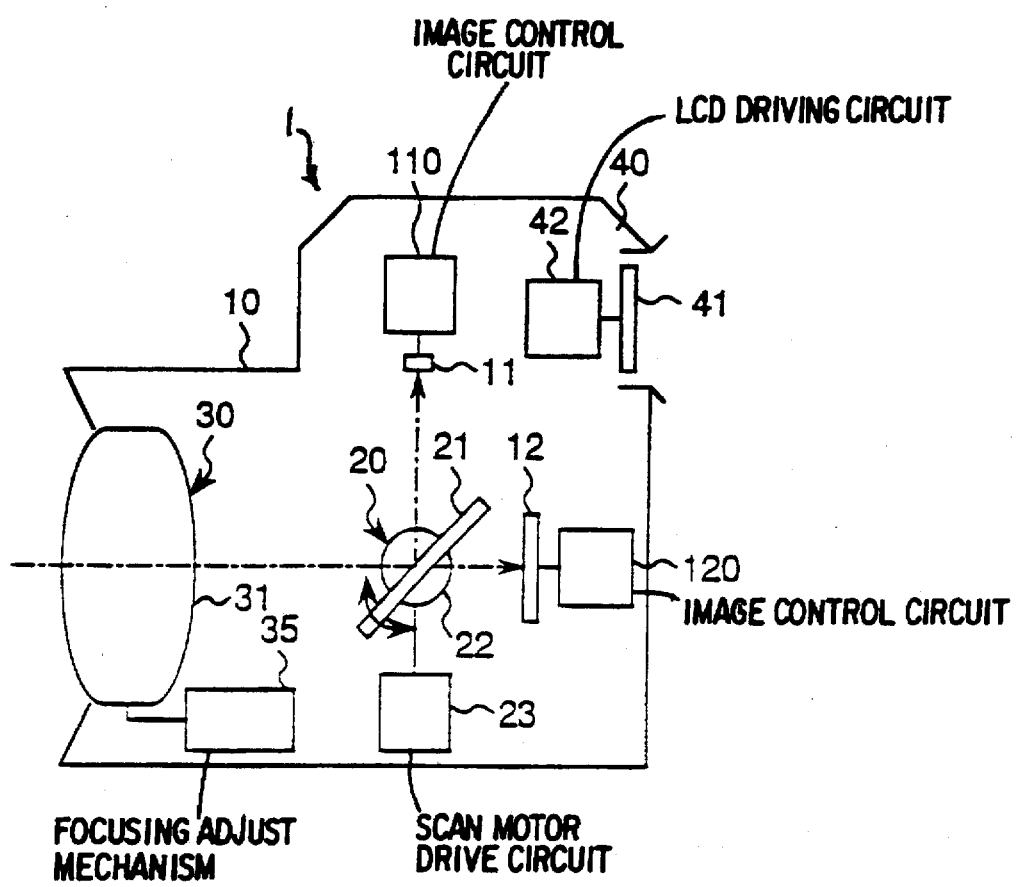
FIG. 1 is a schematic sectional view of an electrical camera of the present invention.

FIG. 1 shows a schematic sectional view of an optical system of an electronic camera 1 according to the present invention. Camera 1, which is a portable color imaging device, comprises a housing 10. Housing 10 includes therein a line sensor 11, an area sensor 12, a line scanning mechanism 20, an optical lens system 30, and an electronic viewfinder 40.

Line sensor 11 includes a number of photoelectric detectors arrayed linearly, i.e., one-dimensionally. Conventional monochrome type CCD (charge coupled device) or MOS (metal oxide semiconductor) are used for the photoelectric detector. In this embodiment, 2,000 photoelectric detectors are arranged in a line.

Figure 8A:
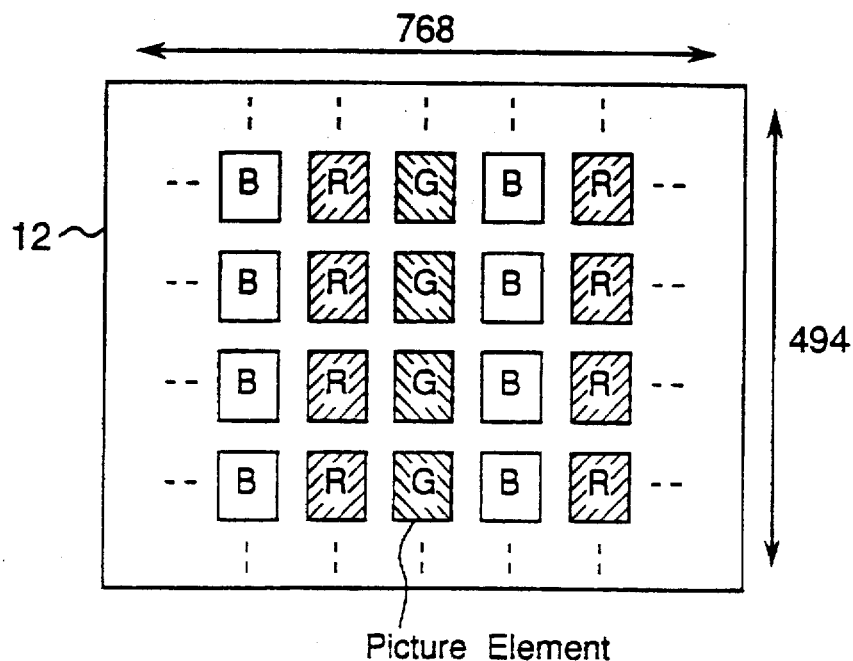
FIGS. 8(A) and (B) show arrangements of picture elements consisting of three different colors; red (R), green (G), and blue (B).
Figure 8B:
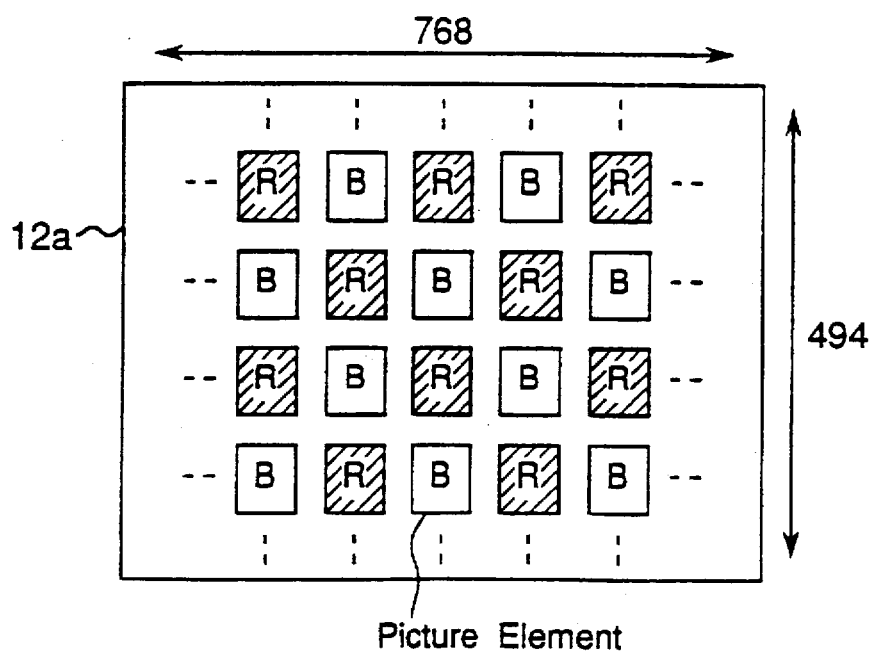

Area sensor 12 also includes a number of photoelectric detectors arrayed in a lattice. Three different types of photoelectric detectors are employed for detecting specific colors, i.e., red (R), green (G), and blue (B), respectively. Conventional color type CCD or MOS is employed for the photoelectric detector. In this embodiment, approximately 380,000 photoelectric detectors are used and are arranged in the form of a matrix consisting of 768 columns and 494 rows. Those detectors for R, G, and B are arranged in a specific pattern such as shown in FIGS. 8(A) or 8(B).

Note that the number of the detectors in the line sensor is greater than that of the detectors in each raw of the area sensor.

Further, line sensor 11 is electrically connected with an image control circuit 110 while area sensor 12 is electrically connected with another image control circuit 120.

Line scanning mechanism 20 includes a dichroic mirror 21. Dichroic mirror 21 is drivingly connected to a scan motor 22 through a rotating shaft (not shown) which extends parallel to a direction in which the photoelectric detectors of line sensor 11 are arrayed, i.e., principal scanning direction. Scan motor 22 is electrically connected to a scan motor drive circuit 23 such that when scan motor drive circuit 23 outputs a signal, scan motor 22 drives dichroic mirror 21. Further, line sensor 11, area sensor 12, and dichroic mirror 21 are so arranged that light reflected from dichroic mirror 21 impinges upon line sensor 11 while light transmitted through dichroic mirror 21 impinges upon area sensor 12, simultaneously. Also, based upon a rotation of dichroic mirror 21, the object is scanned in a direction perpendicular to the principal scanning direction, i.e., sub scanning direction.

Optical lens system 30 includes an objective lens 31 and an electrically driven focusing adjust mechanism 35, which cooperate together to focus the optical image of the object on photoelectric detectors of both line sensor 11 and area sensor 12.

Viewfinder 40 includes a liquid crystal display (LCD) disposed on rear top of housing 10 and a LCD driving circuit 42. A shutter release button not shown is mounted on an upper surface of housing 10.

In operation of electronic camera 1 as constructed, the optical image of the object is transmitted along two optical paths so that same optical image can be impinged upon both line sensor 11 and area sensor 12 at the same time, and therefore there is no parallax between images received by line sensor 11 and area sensor 12, respectively. Also, the optical image is scanned by rotation of dichroic mirror 21, and thus simplifies the construction of the optical mechanism as compared with other optical mechanism in which an additional optical path is provided exclusively for the image to be incident on the line sensor. Further, the line scanning using such rotational mirror permits a high speed scanning and provides a high precision for each distance between lines.

Figure 2:
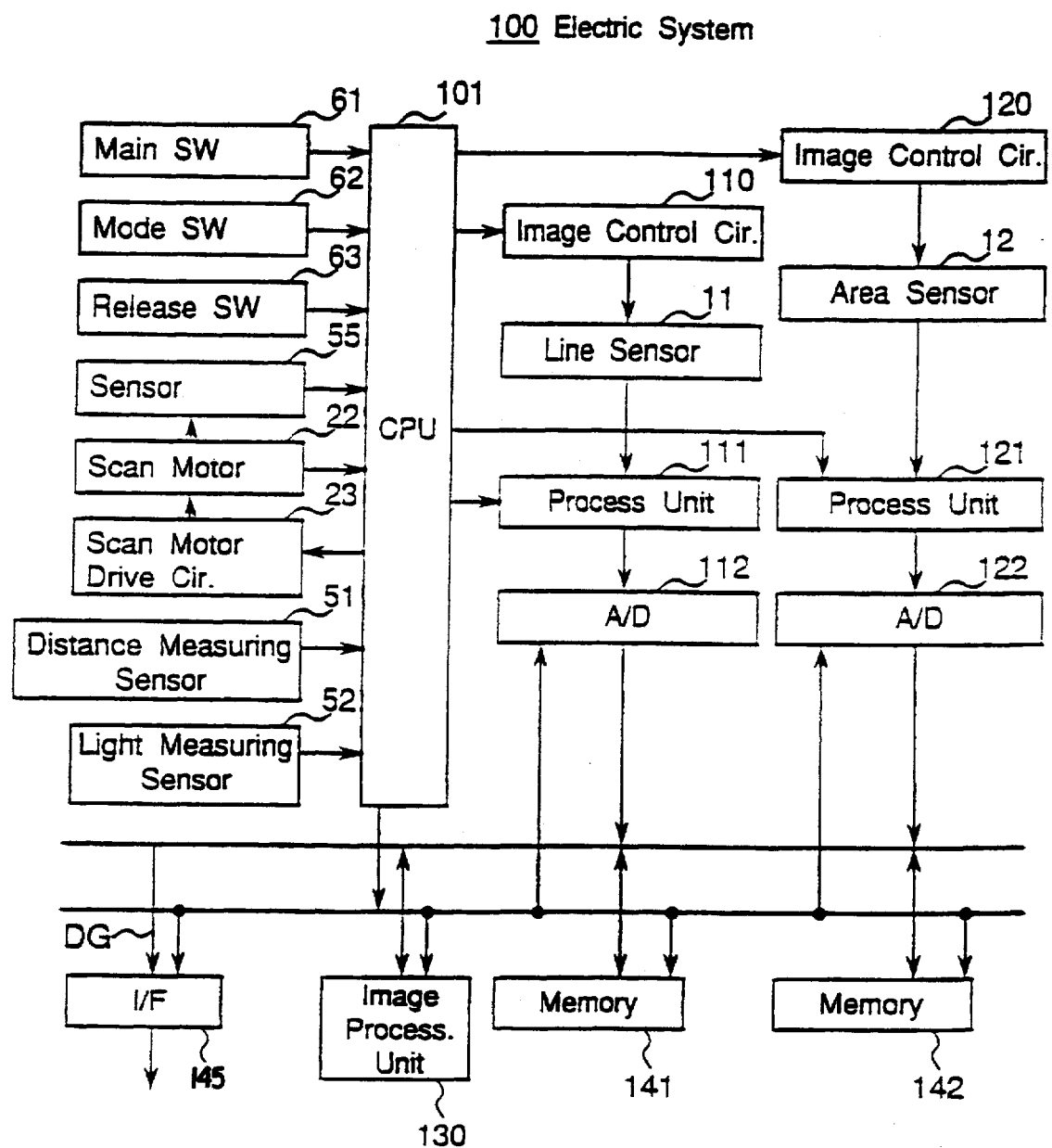
FIG. 2 is a block circuit diagram of the electrical camera.

FIG. 2 is a block diagram of an electric system of camera 1. System 100 includes a central processing unit (CPU) 101 for controlling an overall operation of camera 1. CPU 101 is connected to a plurality of switches 61 to 63, a distance measuring sensor 51, a light measuring sensor 52, and a sensor 55 for sensing a rotational angle and rotational speed of scan motor 22. Based upon signals from those switches and sensors, CPU 101 controls scan motor drive circuit 23, image control circuits 110 and 120, process control units 111 and 121, analogue to digital (A/D) converters 112 and 122, an image processing unit 130, an interface 145, and so on.

Specifically, CPU 101 determines the rotational angle and rotational speed of scan motor 22, and then provides scan motor drive circuit 23 with instructions so that the dichroic mirror 21 can rotate at a predetermined speed to impinge the optical image onto line sensor 11.

The photoelectric detectors of line sensor 11 pick up an optical image of the object in synchronism with each shift gate signal from image control circuit 110. Each image picked up by photoelectric detectors is then converted into an electric image data, which is then transmitted to process unit 111 serially in the order that the photoelectric detectors are arranged. Note that, in this embodiment, line sensor 11 is designed to read 3,000 lines for one optical image. On the other hand, the photoelectric detectors of area sensor 12 pick up the optical image of the object while line sensor 11 scans the overall image of the object. Each photoelectric detector of area sensor 12 converts the optical image into an electric image data. The image data is then delivered for each color to a process unit 121 in the order that the photoelectric detectors are arranged.

The image data from line sensor 11 and area sensor 12 are then processed through, for example, a shading correction at process units 111 and 121, respectively. After that, the image data are quantized at A/D converters 112 and 122, respectively. The quantized image data, which corresponds to each of the photoelectric detectors, is then stored in memory 141 and 142.

Image process unit 130 reads the electric image data picked up by line sensor 11 and area sensor 12 from memories 141 and 142, and then synthesizes them in a certain form as will be described below. An image data DG synthesized is transmitted through an interface 145 to an image memory (not shown) where it is stored therein as an object information. This object information is then fed to an image reproducing device such as a display or printer or an image editing device such as a personal computer, if necessary.

Figure 3:
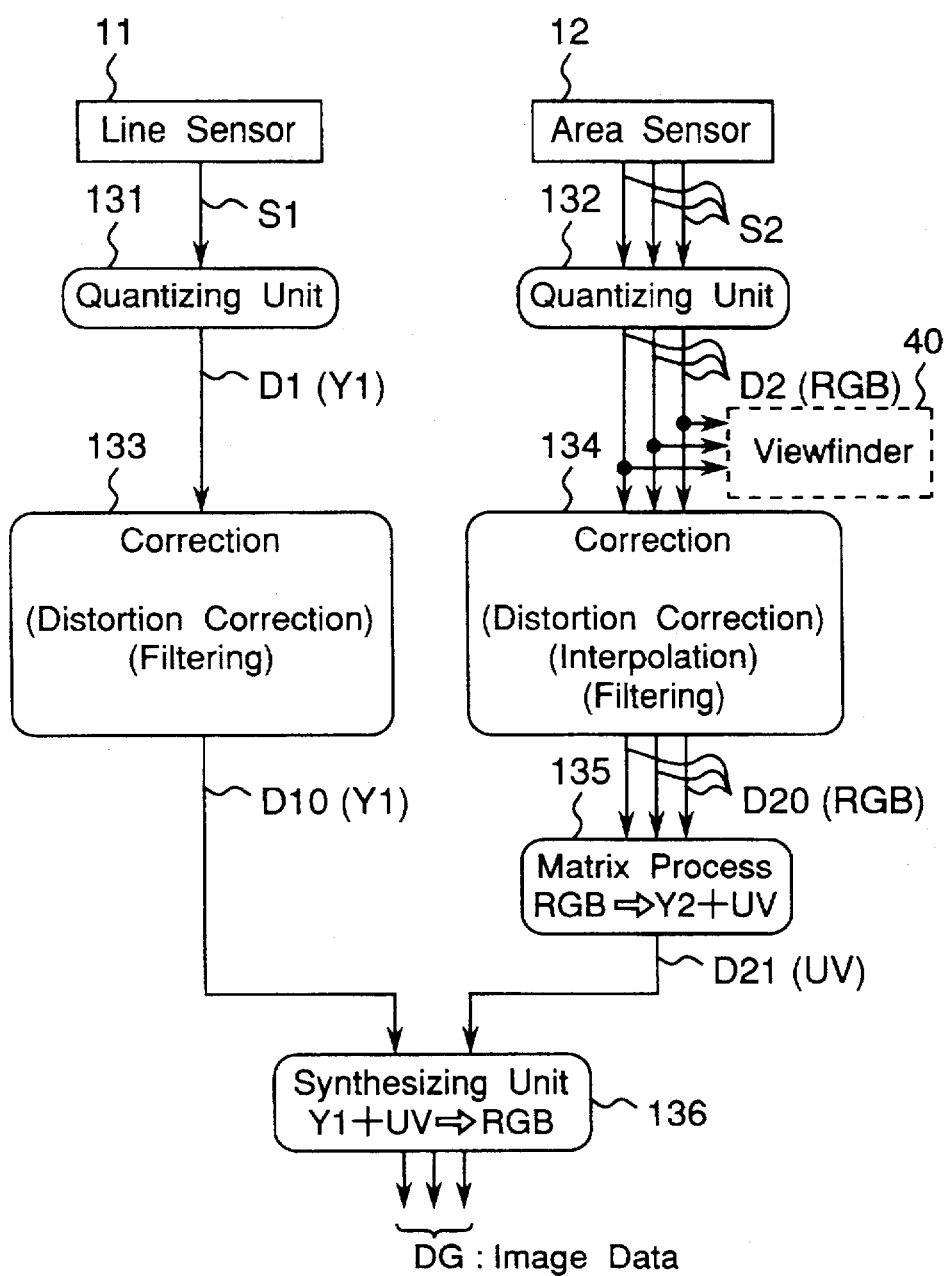
FIG. 3 is a block diagram showing a process of image processing.

FIG. 3 is a block diagram which shows a flow of the image processing. In this process, a photoelectric signal S1 produced by line sensor 11 is fed into a quantizing unit 131 which includes process unit 111 and A/D converter 112. Quantizing unit 131 applies the shading correction and a black-level adjustment to photoelectronic signal S1, and then unit 131 quantizes photoelectric signal S1 into image data D1 consisting of a certain number of bit (for example, eight-bit), corresponding to each of 2,000 photoelectric detector, synchronized with a clock not shown. Each image data D1 represents a brightness Y1 of light picked up by the photo-electric detector.

Each image data D1 is processed at a correction process 133 of image processing unit 130 to eliminate an image distortion which is optically brought about as a result of line scanning and to effect a filtering to improve the quality of the image, through a pipeline image processing. Image data D10 thus processed is then fed to a synthesizing unit 136 which will be described below.

Photoelectronic signals S2 for each color from area sensor 12 are fed into a quantizing unit 132. Quantizing unit 132, like quantizing unit 131, provides specific processes such as a correction of offset between detectors with photoelectric signals S2 and then converts each photoelectric signal S2 into image data D2 consisting of a certain number of bit (for example, eight-bit). Image data D2 represents a color of the object according to a RGB color system. Note that, because only 494 photoelectric detectors are arranged per line in area sensor 12, the resolution of image data D2 is lower than that of image data D1 from the line sensor. Image data D2 is then transmitted both to a correction unit 134 and also to viewfinder 40.

Correction unit 134 provides a correction of the image distortion and a filtering to image data D2. In addition, image data are so interpolated that the number of image data are increased to 2,000 to make its resolution match with that of image data D10, i.e., 2,000. The increased number of image data D20 is fed into a matrix processing unit 135.

Matrix processing unit 135 generates an image data D21 which represents a color, i.e., hue and chromaticness, using the psychometric chroma coordinates of CIE uniform color space (CIELIV), based upon image data D20 of the RGB color system.

Next, in an image synthesizing unit 136, image data D21 is synthesized with associated image data D10 (lightness information) to produce image data DG serially, each of which corresponds to a picture element in a display of the resultant object image.

Note that image data D10 from line sensor 11, which is a high-resolution image of an actual object, includes relatively great effectiveness of wobbling. Contrary to this, although each of image data D21 from area sensor 12 are picked up simultaneously, it is the high-resolution pseudo data which has been obtained by the interpolation of the actual image data having a low resolution. Therefore, image data DG, which is obtained through the synthesizing of image data D10 and D21, has a good quality but has a less effectiveness of wobbling. Meanwhile, a sensitivity of human eyes to color is lower than that to brightness, and therefore to reproduce an image using the composite image data DG has no practical problem.

Figure 4:
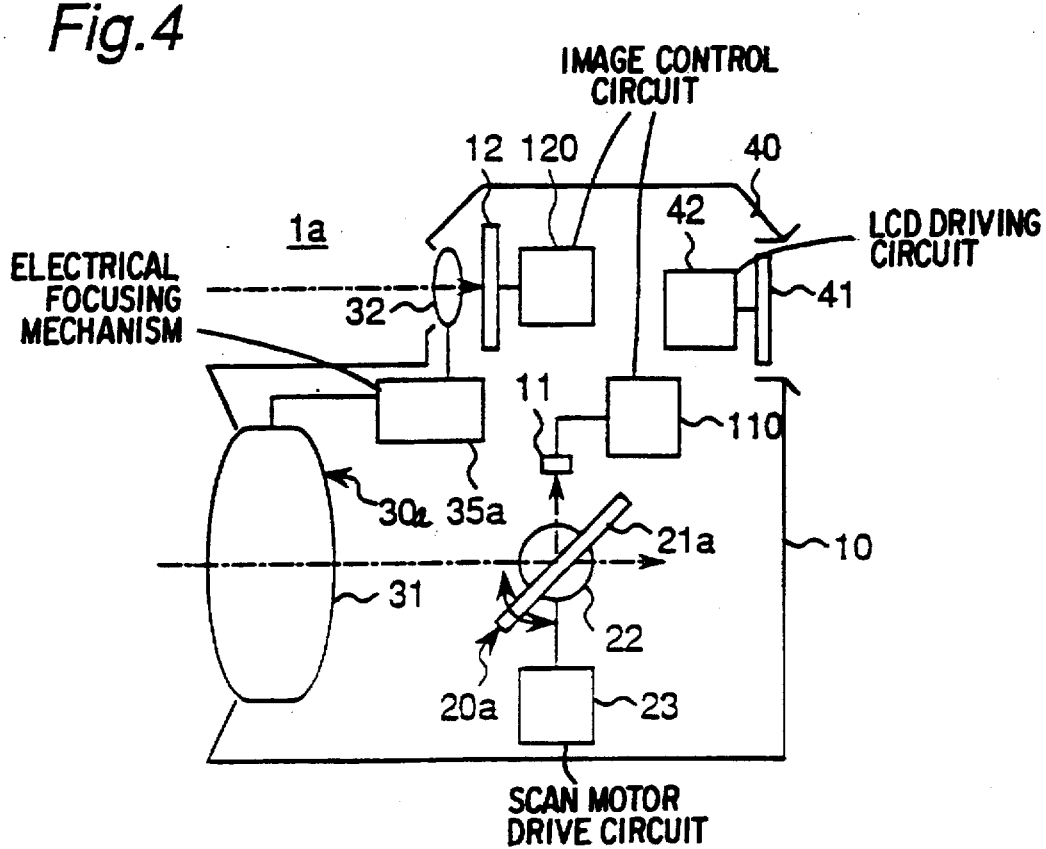
FIG. 4 is a schematic sectional view of an electrical camera according to a second embodiment.
Figure 5:
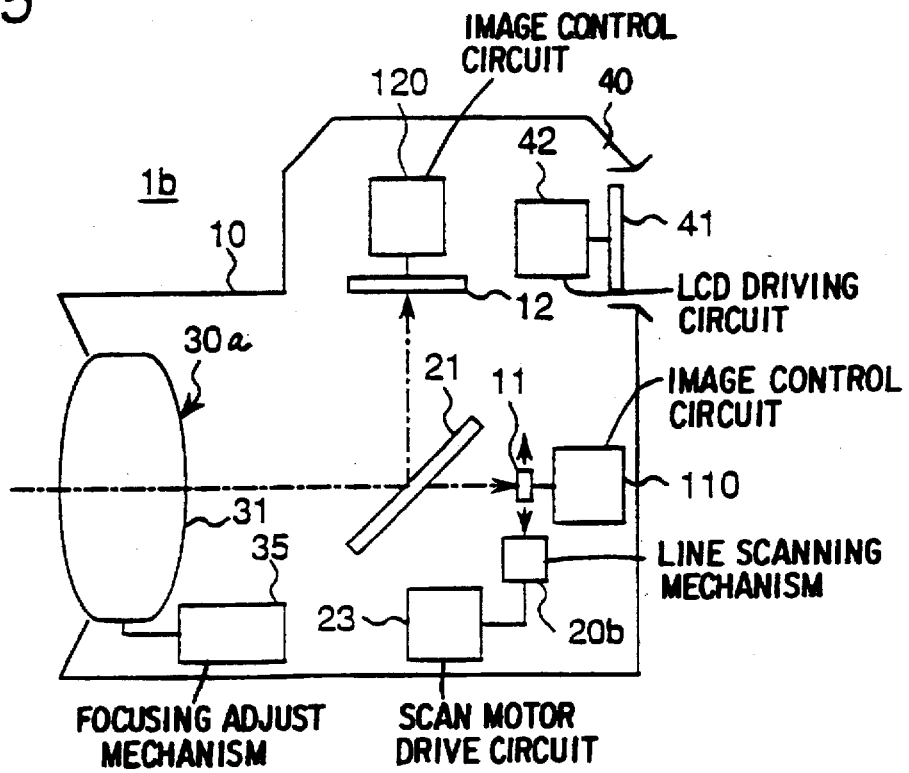
FIG. 5 is a schematic sectional view of an electrical camera of third embodiment.
Figure 6:
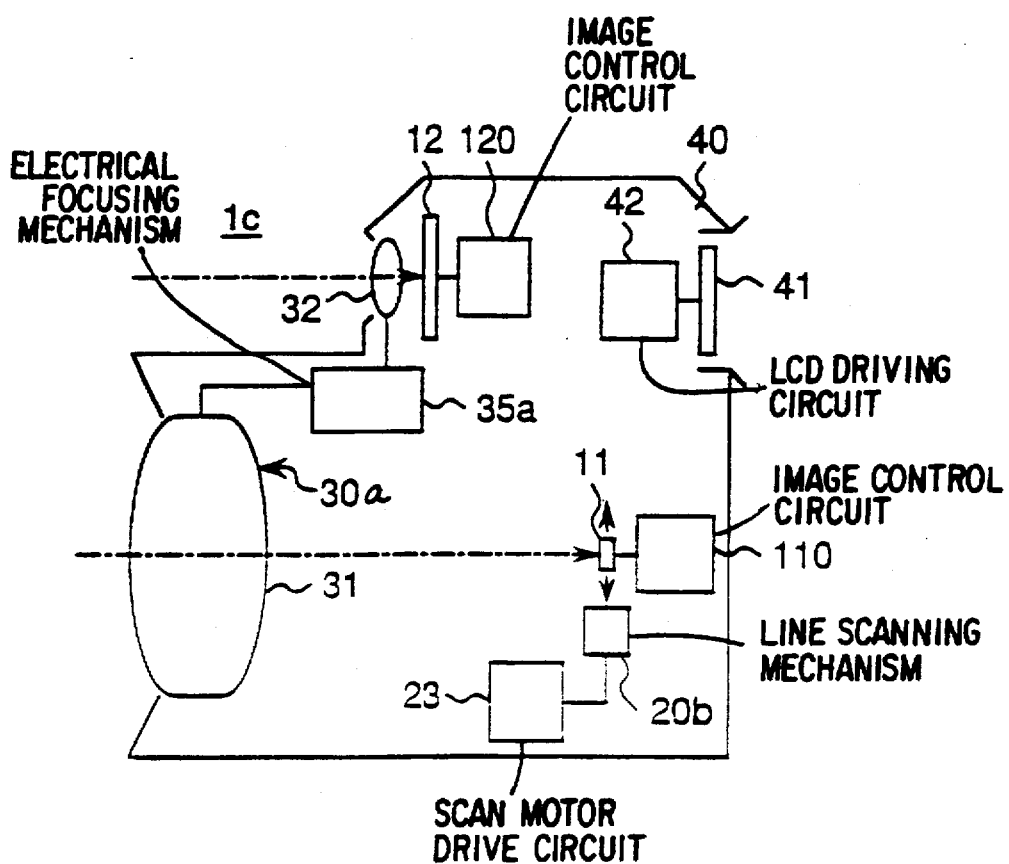
FIG. 6 is a schematic sectional view of an electrical camera according to a fourth embodiment.

FIGS. 4, 5, and 6 shows optical systems of electric cameras 1a to 1c of other embodiments, in which same reference numerals represent the same elements, respectively. Electronic camera 1a in FIG. 4 includes an optical lens system 30a of twin-lens reflex structure, in which two optical paths are provided for line sensor 11 and area sensor 12, respectively. The object image is focused on area sensor 12 through lens 32 while the same impinges upon line sensor 11 through lens 31 and then mirror 21a of line scanning mechanism 20a. Focus adjustment is carried out by an electrical focusing mechanism 35a. With this twin-lens reflex structure, the intensity of the incident light which impinges on sensors 11 and 12 can be increased as compared with a single lens reflex structure in which a light of the object is guided into two paths; one leading to line sensor 11 and the other leading to area sensor 12.

FIG. 5 illustrates an electronic camera 1b of the single lens reflex structure. This camera 1b includes a line scanning mechanism 20b for reciprocating line sensor 11 in a direction perpendicular to an optical axis. No distortion in the optical image is generated because the line scanning is carried out through a movement of the line sensor 11 in the direction perpendicular to the optical axis. Therefore, this system is more advantageous than the mirror rotating system in which a length of optical path from the mirror to the sensor changes according to the rotation of the mirror.

FIG. 6 also shows an electronic camera 1c of the invention. This camera 1c includes an optical lens system 30a of the twin-lens structure which is similar to that of camera 1a shown in FIG. 4 and a line scanning mechanism 20b of the mirror system similar to that of camera 1b in FIG. 5.

Although the description has been made for generating image data DG according to RGB color system in image synthesizing unit shown in FIG. 3, the image data DG from line sensor 11 and area sensor 12 may be synthesized in different manners.

Specifically, as shown in FIG. 7(A), image data may be converted by XYZ color system.

Also, as shown in FIG. 7(B), the darkness of each picture element of the resultant object image may be determined by an information of brilliancy Y2, in the CIE uniform color space, obtained by area sensor 12 and a high frequency component Y1(H) of brightness obtained by area sensor 11. The high frequency component mainly includes information indicating an outline or edge of a character or pattern which can be obtained with a specific space frequency filter.

Further, as shown in FIG. 7(C), each color of the picture element may be determined using both information of R, G, or B color generated by area sensor 12 and the high frequency component Y1(H) of brightness information from line sensor 11. The color information thus determined may be stored in the form of information Y3 and UV which cooperate to represent a color difference.

Furthermore, as shown in FIG. 7(D), image data DG of RGB color system may be generated by another process in which an imaging device having a filter for dividing a green light is used for line sensor 11 while a separate area sensor 12a capable of reading only R(red) and B(blue) is used in place of area sensor 12. In such case, an image data of green color generated from line sensor 11 is divided into a high frequency component G(H) and a low frequency component G(L). The image data is then synthesized with another image data from area sensor 12a.

In any one of embodiments as described, electric viewfinder uses image data D2 of area sensor 12, which enables electric cameras to be compact and light-weighted rather than that of having the optical finder. Also, using the area sensor provides image data D20 picked up at the same time. Therefore, additional advantages can be provided for the imaging device by using image data D20 in a variety of image processes such as process for correcting the distortion derived from the line scanning by means of extracting outlines of the object, process for efficiently compressing the image through a recognition of a configuration and area determination, or a process for preventing flicker fringes based upon a variation of the amount of light from the light source.

As described above, the present invention provides the imaging device with line sensor capable of reading and converting the object image into single color data and area sensor capable of reading and converting the image into a plurality of color data, which enables the device to take a picture with a high resolution. This permits the imaging device to use an image buffer having a small capacity. Further, the image processing in which data is transmitted one place to another is carried out in a short time.

Therefore, the present invention make use of a advantageous combination of the line and area sensors, which enables the imaging device to take a high-resolution picture of the object without any defect such as distortion.

While the invention has been described with reference to exemplary embodiment, it is not limited thereto. Rather, the appended claims should be construed to include other variants and embodiments of the invention which may be made by those skilled in the art without departing from the true spirit and scope of the present invention.

What is claimed is:

1. An imaging apparatus for converting an optical image of an object into a set of image data each corresponding to a picture element, comprising:

an area sensor for receiving the optical image and then converting the same into a first data;

a line sensor for receiving the optical image and then converting the same into a second data;

a lens system for focusing the optical image onto the area and line sensors;

a scanning mechanism for moving the line sensor relative to the optical image to scan the optical image; and image processing means for synthesizing the first and second data to produce a composite data and then outputting the composite data as the image data.

2. An imaging apparatus as recited in claim 1, wherein the first data includes color information while the second data includes brightness information, and therein the image processing means produces the composite data by synthesizing the color information and the brightness information.

3. An imaging apparatus as recited in claim 1, wherein the first data includes a color information of a RGB color system while the second data includes a brightness information, the image processing means determines a color of each picture element using components of high frequency of the color and brightness information.

4. An imaging apparatus as recited in claim 1, wherein the scanning mechanism comprises a mirror and a motor for rotating the mirror.

5. An imaging apparatus as recited in claim 1, wherein the scanning mechanism comprises a drive source for moving the line sensor back and forth in a direction perpendicular to an optical axis of the optical image.

6. An apparatus as recited in claim 1, further includes an electronic viewfinder to which the first data is transmitted.

7. A method for converting an optical image of an object into a set of image data each corresponding to a picture element, comprising steps of:

receiving the optical image and converting the same into a first data using an area sensor;

receiving the optical image and converting the same into a second data using a line sensor; and producing the image data from the first and second data.

8. A method as recited in claim 7, wherein the first data includes color information while the second data includes brightness information, and therein the image data is produced by synthesizing the color and brightness information.

9. A method as recited in claim 7, wherein the step of producing the image data further comprises:

extracting data with respect to an outline of the object in the optical image from the first data;

correcting the second data according to the extracted data; and outputting the corrected second data as the image data.

10. A method as recited in claim 7, wherein the image data is produced by synthesizing the first and second data in said producing step.

11. An imaging apparatus for converting an optical image of an object into a set of image data each corresponding to a picture element, comprising:

an area sensor;

a line senor;

a lens system which focuses the optical image onto the area sensor and the line sensor;

a scanning mechanism which moves the line sensor relative to the optical image to scan the optical image; and an image processor which produces the image data from a first data output from the area sensor and a second data output from the line sensor.

12. An imaging apparatus as recited in claim 11, wherein said image processor synthesizes the first data and the second data to produce a composite data as the image data.

13. An imaging apparatus as recited in claim 12, wherein the first data includes a color information of a RGB color system while the second data includes a brightness information, the image processor determines a color of each picture element using the color information and the brightness information.

14. An imaging apparatus as recited in claim 11, wherein said lens system includes a first lens unit which focuses the optical image onto the area sensor and a second lens unit which focuses the optical image onto the line sensor.

15. An imaging apparatus as recited in claim 1, wherein the image data is useful for reproducing the optical image of the object.

16. A method as recited in claim 7, wherein the image data is useful for reproducing the optical image of the object.

17. An imaging apparatus as recited in claim 11, wherein the image data is useful for reproducing the optical image of the object.

* * * * *